Aug. 22, 1967        C. L. NORLIN        3,336,786
BICYCLE REPAIR TOOL
Filed Oct. 26, 1964        2 Sheets-Sheet 1
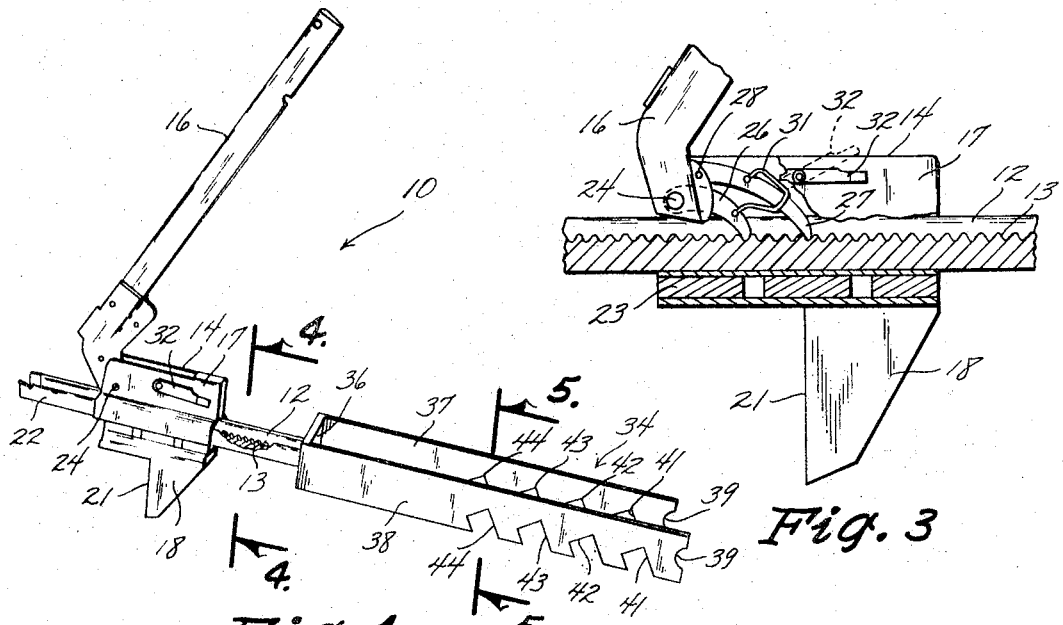
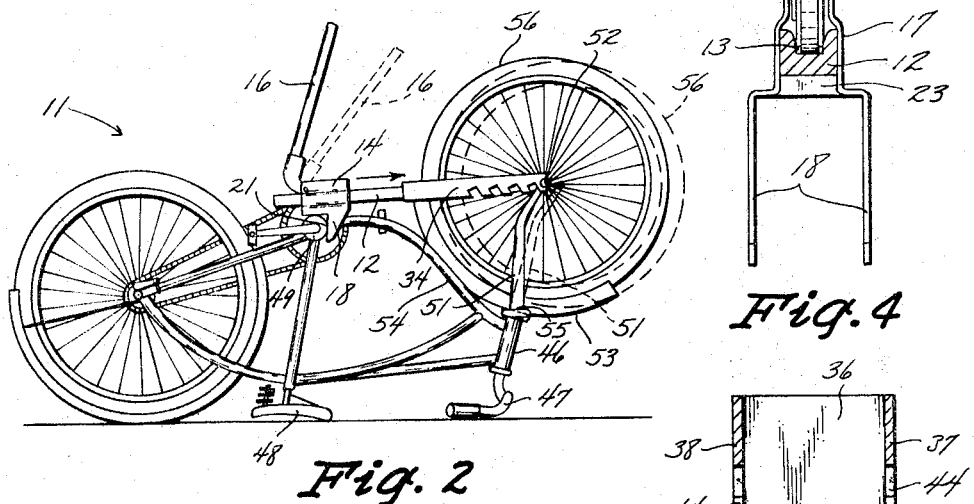
INVENTOR
CARMEN L. NORLIN
BY
L. Robert Henderson
ATTORNEY

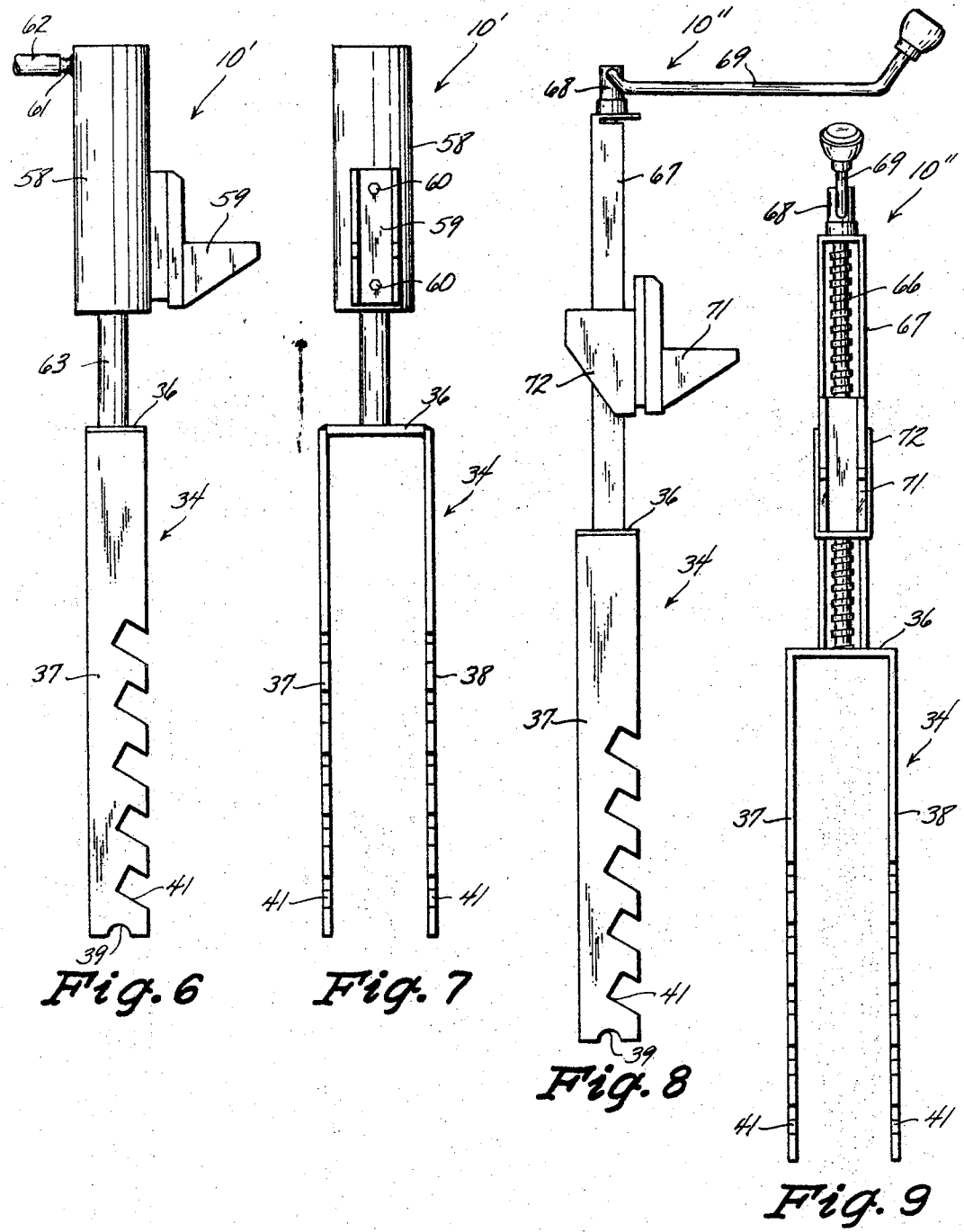

United States Patent Office 3,336,786
Patented Aug. 22, 1967

3,336,786
BICYCLE REPAIR TOOL
Carmen L. Norlin, 323 N. Chestnut St.,
Monticello, Iowa 52310
Filed Oct. 26, 1964, Ser. No. 406,419
2 Claims. (Cl. 72—392)

This invention relates generally to bicycles, and more particularly to a tool for repairing a bicycle.

Conventional bicycles including a bifurcated front fork the lower end of which is connected to the opposite ends of a front axle, and the upper end of which is integral with a spindle journaled into a part of the frame of the bicycle. Quite often, the result of a bicycle running head-on into an object is damage to the front fork.

This damage usually results in the front fork bending rearwardly at the junction of the fork with the spindle, the junction commonly called the "sure bend" point. Prior to this invention, to repair this damage, the bicycle would need to be dismantled, the front fork placed in a vise, and a pair of pipes over the fork arms. Upon forcing the pipes in the proper direction, it was possible to do a passable repair job without too much accuracy. Another method of repairs is to place the spindle in a press and attempt to re-align the spindle with the arms by the application of pressure. Neither repair is satisfactory from either the viewpoint of quality or time.

It is, therefore, an object of this invention to provide a new and novel bicycle repair tool.

Another object of this invention is the provision of a new and novel tool for straightening a bicycle front fork but at the junction with its spindle.

Still another object of this invention is the provision of a tool for repairing a bicycle front fork without dismantling the bicycle.

It is another object of this invention to provide a new and novel tool for repairing a bicycle front fork bent at the sure bend point, which tool brings the fork back in alignment with its spindle without dismantling the bicycle and in but a few moments.

Another object of this invention is the provision of a tool capable of attaining the objectives listed hereinbefore which is economical to manufacture, simple in structure, and effective in performance.

These objects, and other features and advantages of this invention will become readily apparent upon reference to the following description, when taken with the accompanying drawings, wherein:

FIG. 1 is a perspective view of the tool of this invention;

FIG. 2 is a side elevational view of a bicycle to which the tool has been applied, and showing the relative position of parts before and after the repair;

FIG. 3 is an enlarged, elevational view of the pawl and ratchet arrangement of the tool, one side of a housing removed for clarity of illustration;

FIG. 4 is an enlarged sectional view taken along the line 4—4 in FIG. 1;

FIG. 5 is an enlarged sectional view taken along the line 5—5 in FIG. 1;

FIGS. 6 and 7 are side elevational views of a modified tool; and

FIGS. 8 and 9 are side elevational views of a second modified tool.

Referring now to the drawing, the bicycle repair tool of this application is best illustrated in FIG. 1, and designated generally at 10. The tool is adapted for particular use in repairing a bicycle 11 (FIG. 2) as will be described in detail hereinafter.

The tool 10 comprises an elongated, V-shaped ratchet shaft 12 having teeth 13 (FIG. 3) formed in longitudinally spaced relation thereon. The ratchet shaft 12 is reciprocally inserted through a pawl unit 14 operable by means of a handle 16 to "walk" by virtue of the pawl arrangement longitudinally of the shaft 12. In effect, the ratchet shaft 12, pawl unit 14, and handle 16 are substantially similar to and operate like a conventional automobile jack device.

The pawl unit 14 comprises a housing 17 including a pair of transversely spaced, identical projections 18, each having an L-shaped edge 21 (FIGS. 1 and 3) which faces toward one end 22 of the ratchet shaft 12.

The shaft 12 is adapted to slide along a base 23 of the housing 17 and beneath a pivot 24 for the handle 16. Also attached to the pivot 24 is a first pawl 26 the free end of which is adapted to selectively engage the teeth 13 of the shaft 12. A second pawl 27 (FIG. 3) is also connected to the housing 17 by means of a pivot 28. The pawls 26 and 27 are maintained in a predetermined relationship by means of a spring 31 (FIG. 3), and the spring 31 is frictionally engageable by one end of a lever 32 movable from a full line position as best shown in FIG. 3, where the spring 31 is unaffected, to a dotted line position as best shown in FIG. 3 where the spring 31 aids in forcing the pawls 26 and 27 downwardly against the teeth 13 of the ratchet shaft 12. In operation, the pawl unit 14 is "walked" longitudinally forward or backward, or upward or downward as the case may be, on the ratchet shaft 12.

The tool 10 is completed by the provision of a U-shaped extension 34 (FIG. 1) which includes a base 36 secured as by welding to the shaft 12. A pair of parallel, relatively flat and straight arms 37 and 38 extend from the base 36 in a direction opposite from the end 22 of the shaft 12 and from the direction which the L-shaped edges 21 face. Each free end of each arm 37 and 38 has a concavely formed portion 39 therein, and common edges of the arms 37 and 38 have longitudinally, equally spaced notches 41, 42, 43, and 44 formed therein, as best illustrated in FIG. 1. (Referring now to FIG. 2, the bicycle 11 is of a conventional type having a frame 46, handle bars 47, seat 48, pedal spindle housing 49, a front fork 51, a front axle 52, the opposite ends of which are exposed, a front fender 53, and a front wheel 56.) In FIG. 2, the front wheel 56 and front fork 51 are shown in full line to illustrate their positions relative to the remainder of the bicycle subsequent to an accident where the front fork 51 has been forced rearwardly toward the pedal spindle housing to such an extent that the front fender 53 is contiguous with a brace bar 54 adjacent thereto. The spindle (not shown) of the front fork 51, rotatably inserted into a journal portion of the frame 46, is thus not in alignment with the front fork 51.

To repair this damage, the bicycle is turned upside down and placed on the handle bar 47 and the seat 48, the bicycle 11 being balanced in this position. The repair tool 10 is then placed in engagement with the bicycle 11 as illustrated. The projections 18 of the pawl unit 14 are placed in engagement with the pedal spindle housing 49 and whereby they are intermediate the spindle housing 49 and the front axle 52. Referring to FIG. 2, it can be seen that the L-shaped edges 21 of the projections 18 face rearwardly of the bicycle and opposite of the front wheel 56. The extension 34 is then placed so that the front ends of the arms 37 and 38 engage, by means of the curved portions 39, the front axle 52 at the exposed opposite ends thereof. Then, by placing the lever 32 in the raised position (FIG. 3) and by pivoting the handle 16 back and forth about its pivot 24, the pawl unit 14 is forced away from the extension 34.

As the frame 46 of the bicycle 11 is stable and stationary, and as the front fork 51 is bendable at the sure bend point 55 upon ratcheting the pawl unit 14, the extension 34 will actually move in the direction shown by the arrow in FIG. 2 until the front fork 51 has been straightened relative to its spindle (not shown) and has assumed a correctly aligned position as indicated by dotted lines in FIG. 2.

When the repair of the front fork 51 has been completed, by merely repositioning the lever 32 (FIG. 1) and again pivoting the handle 16, the repair tool 10 is easily removed from the bicycle 11. The bicycle may then be returned to its normal upright position and used, the repairing taking but a few moments, and with the front fork 51 being accurately repositioned to its normal position.

Referring now to FIGS. 6 and 7, a modified repair tool 10' is illustrated. All parts identical to those of the repair tool 10 are indicated by like reference numerals.

The modified repair tool 10' includes a hydraulic cylinder housing 58 having an L-shaped projection 59 secured thereto as by cap screws 60. A hydraulic fitting 61 is provided for the housing 58 at the upper end thereof, and a conduit 62 is attached for supplying fluid under pressure from a source to the interior of the housing.

This supply and exhausting of fluid is operable to reciprocate a piston (not shown) inside the housing 58 of a conventional nature. A piston rod 63 extends from the housing 58 and is attached to the base 36 of the U-shaped extension 34.

Thus, the repair tool 10' is mounted on the bicycle in exactly the same manner as the tool 10, but instead of a manually operated pawl and ratchet unit, a hydraulically operated tool is provided.

Referring to FIGS. 8 and 9, a sceond modified repair tool 10'' is illustrated. Here again, all parts of the tool 10'' which are identical to those of the repair tool 10 are indicated by like reference numerals.

The second modification utilizes an elongated helical screw shaft 66 rotatably mounted inside a rectangular housing 67 having a bearing 68 mounted at one end. A handle 69 is rotatably secured to the upper end of the shaft 66 whereby the shaft 66 can be rotated relative to its housing 67. An L-shaped projection 71, similar to the projection 59 of the tool 10', and the projection 18 of the tool 10, is secured to a carrier part 72 which is threadably connected to the screw shaft 66 for moving longitudinally of the housing 67 in response to rotation of the screw shaft 66. The housing 67 is secured to the base 36 of the U-shaped extension 34.

Thus, as compared to the hydraulically actuated repair tool 10', and to the mechanically actuated repair tool 10, the second modification 10'' is manually actuated on a rotating screw principle. It is mounted on the bicycle so that the L-shaped portion of the projection 71 is in engagement with the pedal spindle housing 49 in much the same manner as the projection 18 of the tool 10. Either the outer ends of the arms 37 and 38 are engaged with the front axle opposite ends 52, or should the bicycle 11 be of a smaller nature, any of the transversely aligned pairs of notches 41–44 can be used to receive therein the opposite ends of the front axle 52. Rotation, then, of the handle 69 effects a movement of the projection 71 and the housing 67 in opposite directions, whereby the front fork 51 of the bicycle is again straightened in exactly the same manner as described hereinbefore with respect to repair tool 10.

Although a preferred embodiment and two modifications thereof have been described hereinbefore, it is to be remembered that various other modifications and alternate constructions can be made thereto without departing from the true spirit and scope of the invention as defined in the appended claims.

I claim:

1. A tool for use in repairing a bicycle, the bicycle having a front fork extended axially from a rotatable spindle, a front axle the opposite ends of which are exposed, and a pedal spindle housing, a tool for straightening the front fork relative to its spindle when the front fork is bent toward the pedal spindle housing, the tool comprising in combination:

first means engageable with the pedal spindle housing;
second means operably engaged with said first means, and including a pair of immovable, laterally spaced parallel arms adapted to extend on opposite sides of the bicycle, the free ends of the arms adapted to engage the front axle opposite ends, said arms having transversely aligned, identical notches formed one pair of common edges thereof, each pair of transversely aligned notches also engageable with the front axle opposite ends and sloped upwardly and away from the free ends of said arms; and
means operatively engaged with both said first means and said second means, and operable to force same apart from each other a predetremined distance, whereby to force the front fork away from the pedal spindle housing.

2. A tool comprising in combination:
a ratchet shaft;
a pawl unit operably mounted on said ratchet shaft and adapted to lockingly walk back and forth on same;
a handle for operating said pawl unit relative to said ratchet shaft; and
a U-shaped device the base of which is secured and extended to one end of said ratchet shaft, in axial alignment therewith, said device having immovable, laterally spaced parallel arms the free ends of which each have a concavely curved portion, said arms having transversely aligned, longitudinally spaced, subtantially identical notches formed in one pair of normally lower common edges, said notches extend away from the said free arm ends.

References Cited
UNITED STATES PATENTS

| | | | |
|---|---|---|---|
| 613,792 | 11/1898 | Boynton | 254—82 |
| 662,101 | 11/1900 | Short | 254—82 |
| 2,165,503 | 7/1939 | Pfauser | 72—392 |
| 2,718,253 | 9/1955 | Zinke | 72—705 |

CHARLES W. LANHAM, *Primary Examiner.*

L. A. LARSON, *Assistant Examiner.*